(12) United States Patent
Cazalis et al.

(10) Patent No.: US 11,958,614 B2
(45) Date of Patent: Apr. 16, 2024

(54) SEAT, IN PARTICULAR FOR AN AIRCRAFT, WITH A SINGLE ACTUATOR

(71) Applicant: Safran Seats, Plaisir (FR)

(72) Inventors: Olivier Cazalis, Deols (FR); Laurent Ligonniere, Issoudun (FR); Julien Varnier, Sainte Lizaigne (FR)

(73) Assignee: Safran Seats, Plaisir (FR)

( * ) Notice: Subject to any disclaimer, the term of this patent is extended or adjusted under 35 U.S.C. 154(b) by 164 days.

(21) Appl. No.: 17/772,127

(22) PCT Filed: Oct. 21, 2020

(86) PCT No.: PCT/EP2020/079562
§ 371 (c)(1),
(2) Date: Apr. 26, 2022

(87) PCT Pub. No.: WO2021/083754
PCT Pub. Date: May 6, 2021

(65) Prior Publication Data
US 2022/0402615 A1    Dec. 22, 2022

(30) Foreign Application Priority Data
Oct. 31, 2019   (FR) ..................................... 1912252

(51) Int. Cl.
*B64D 11/06*   (2006.01)
(52) U.S. Cl.
CPC ........ *B64D 11/0641* (2014.12); *B64D 11/064* (2014.12); *B64D 11/0642* (2014.12)
(58) Field of Classification Search
CPC .............. B64D 11/0641; B64D 11/064; B64D 11/0642; Y02T 50/40
See application file for complete search history.

(56) References Cited

U.S. PATENT DOCUMENTS

| 2003/0189360 A1 | 10/2003 | Laurent |
| 2014/0300145 A1* | 10/2014 | Beroth ............... B64D 11/0643 |
| | | 297/83 |

FOREIGN PATENT DOCUMENTS

| CN | 108715227 A | 10/2018 |
| EP | 1352828 A1 | 10/2003 |
| WO | 2012053022 A1 | 4/2012 |

OTHER PUBLICATIONS

International Patent Application No. PCT/EP2020/079562, International Search Report (with English translation) and Written Opinion, dated Jan. 11, 2021.

* cited by examiner

*Primary Examiner* — Alentina Xavier
(74) *Attorney, Agent, or Firm* — Kilpatrick Townsend & Stockton LLP

(57) ABSTRACT

The invention relates to a seat, in particular for an aircraft, including:
  a seat support,
  a seat base,
  a backrest hinged relative to the seat base by means of a pivot link,
  a leg rest hinged relative to the seat base by means of a pivot link,
  the seat being able to move between a sitting position and a bed position in which the backrest and the leg rest are situated in a continuation of the seat base,
  the seat base being mounted so as to be able to slide relative to the seat support,
  the seat comprising at least one connecting rod, referred to as the backrest pivot connecting rod, comprising a first end connected in rotation relative to the backrest and a second end connected in rotation relative to the seat support, (Continued)

the leg rest being mechanically connected to the backrest by means of a connecting rod deployment device, the seat further comprising a single actuator capable alone of moving a set of components of the seat formed at least by the seat base, the backrest, and the leg rest in order to move the seat from its sitting position to its bed position and vice versa.

15 Claims, 9 Drawing Sheets

[Fig. 1]
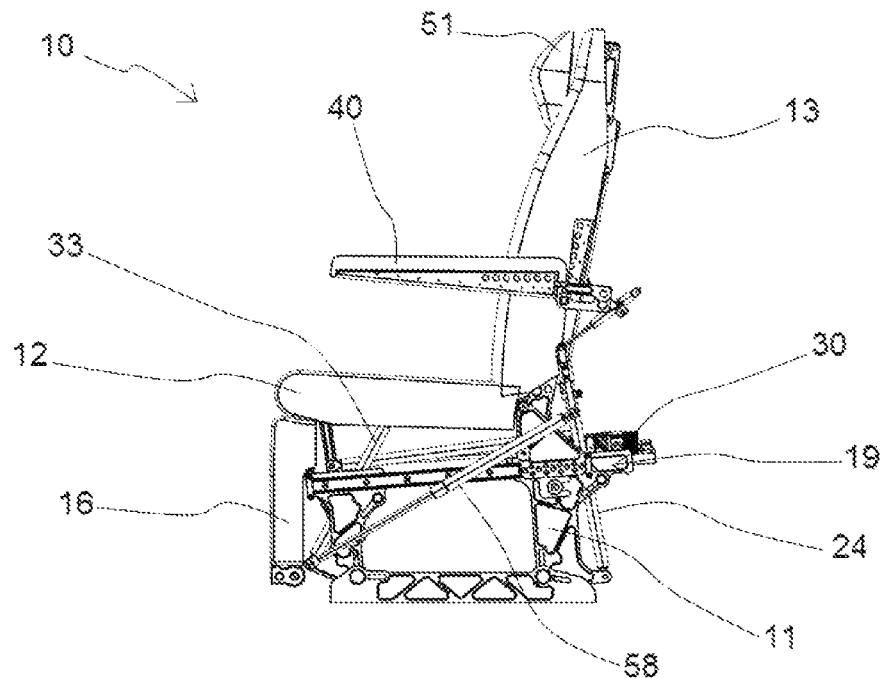
[Fig. 2a]
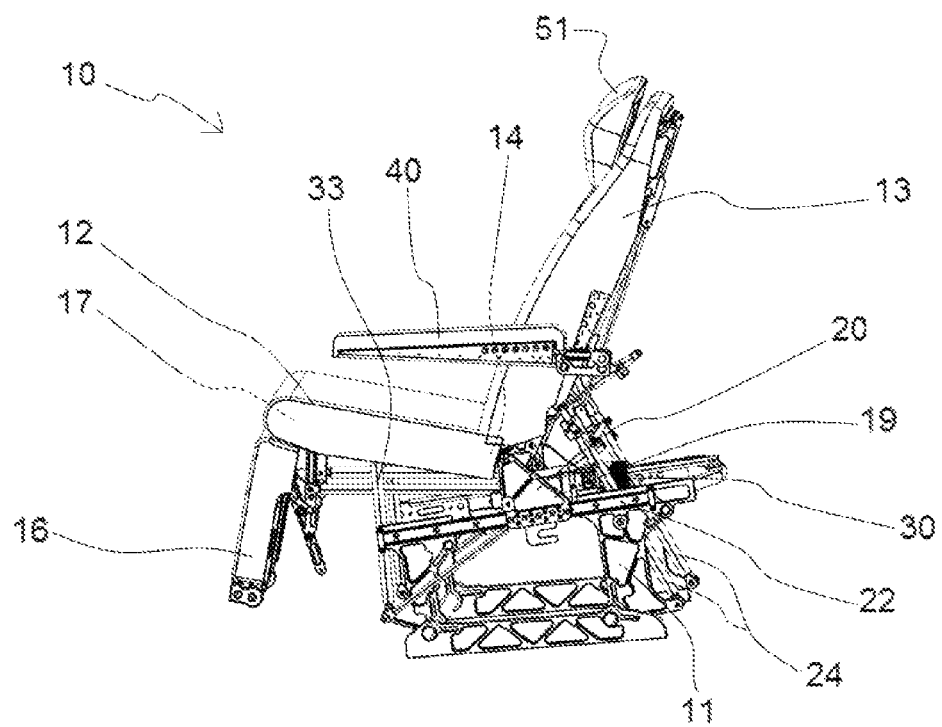

[Fig. 2b]
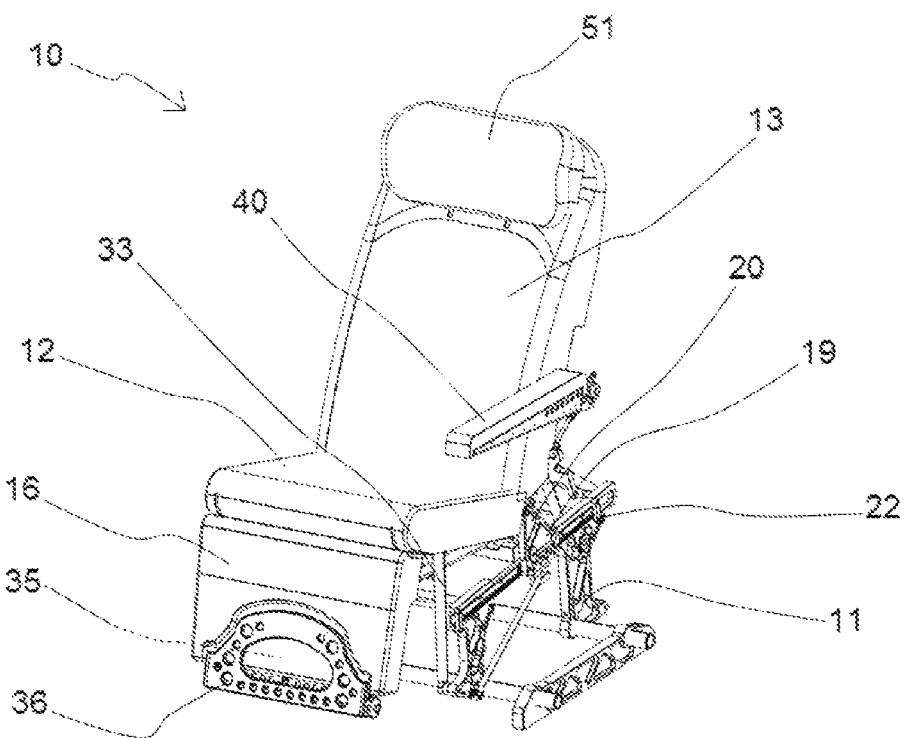
[Fig. 2c]
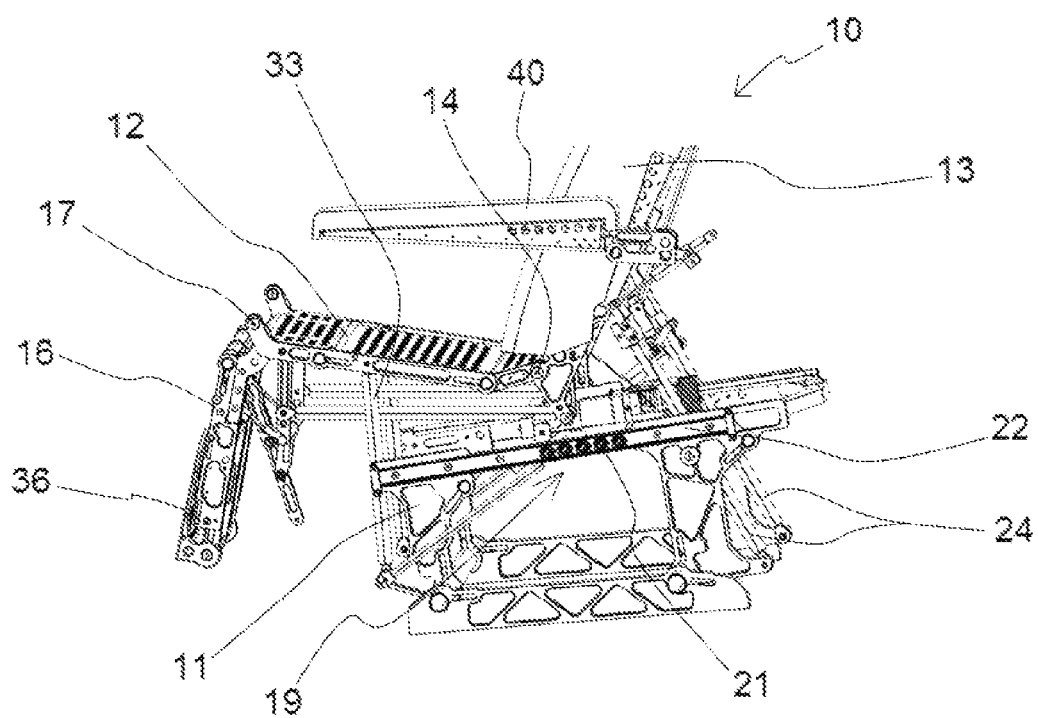

[Fig. 3a]
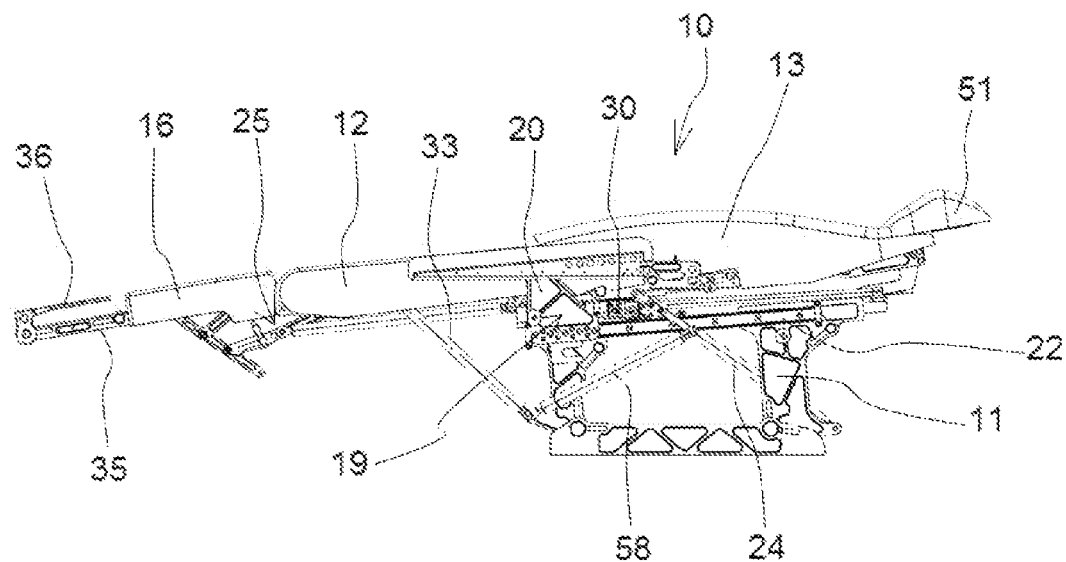
[Fig. 3b]
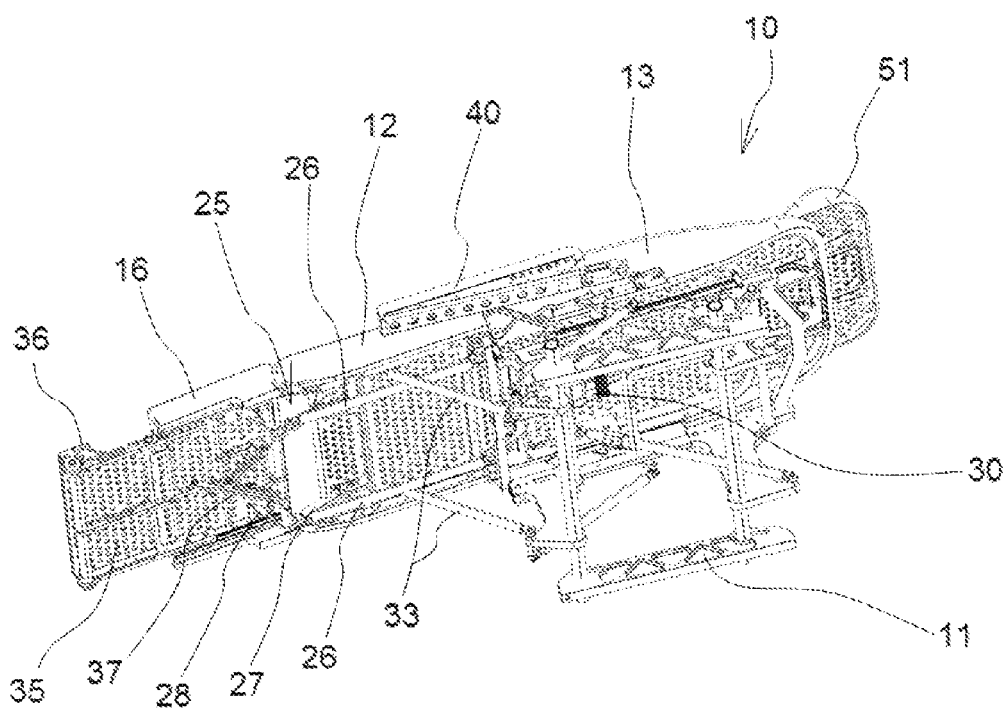

[Fig. 4]
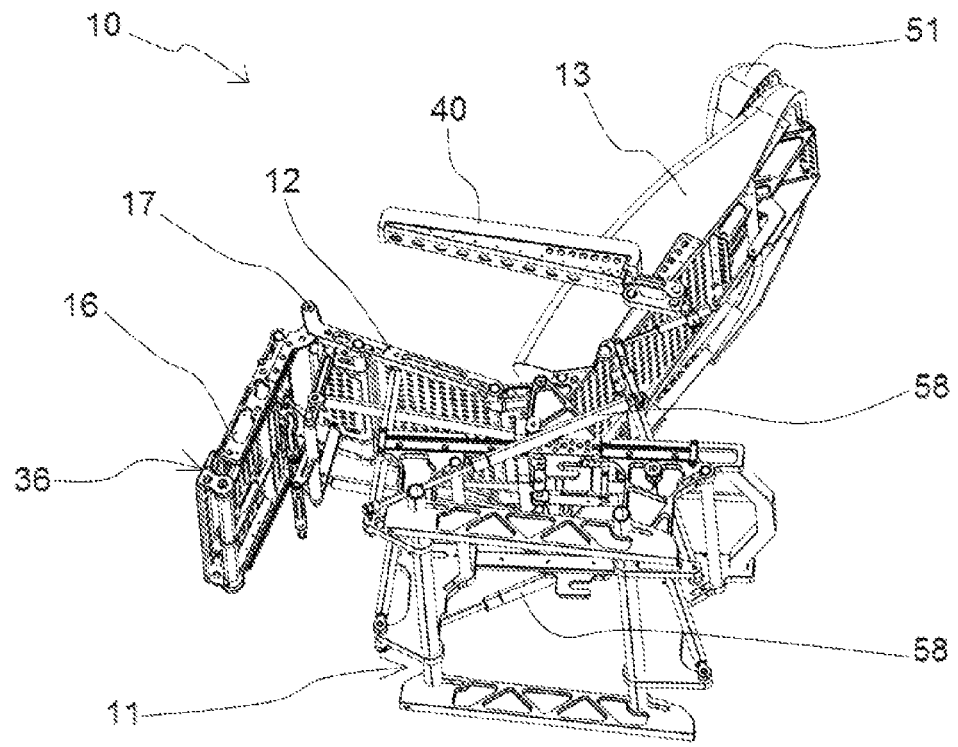
[Fig. 5a]
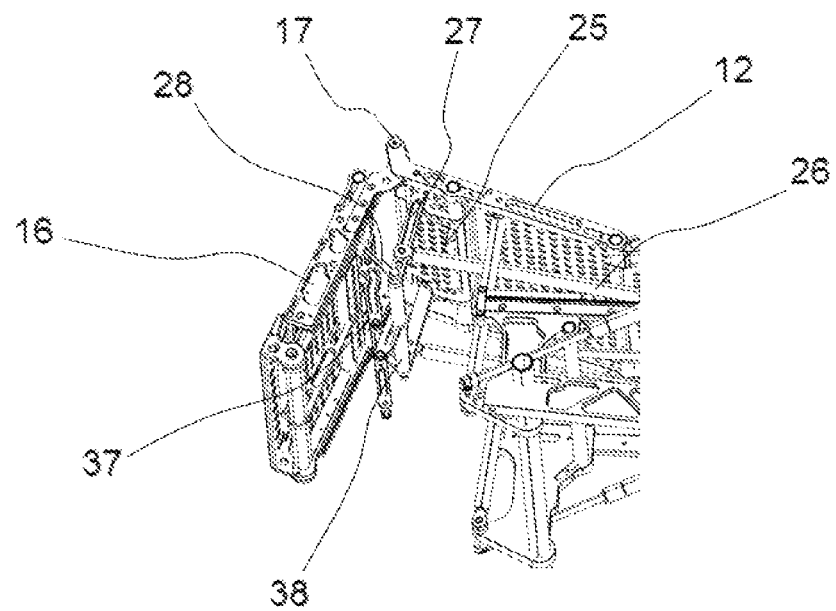

[Fig. 5b]
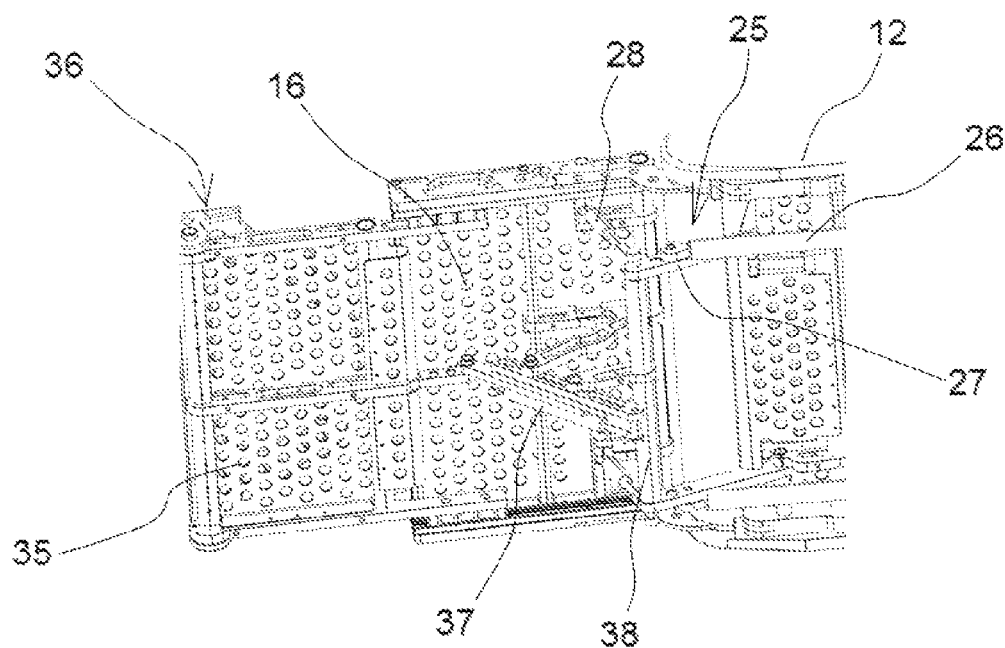
[Fig. 6]
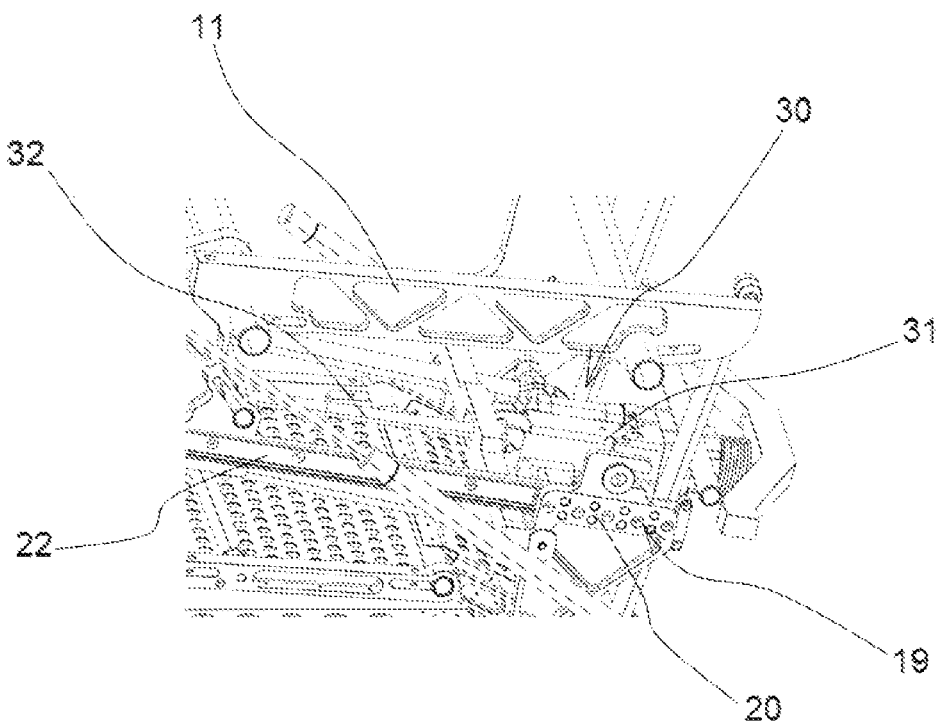

[Fig. 7]
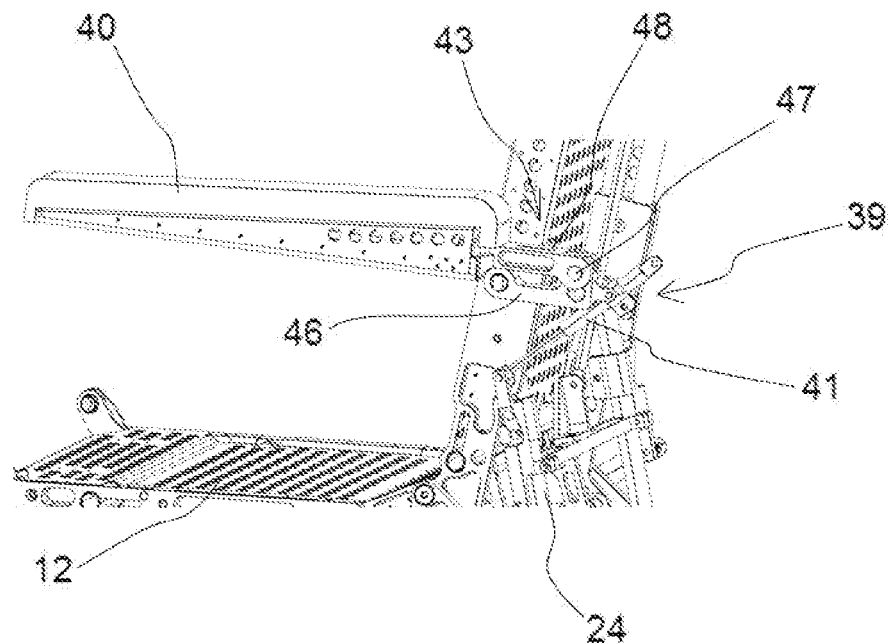
[Fig. 8a]
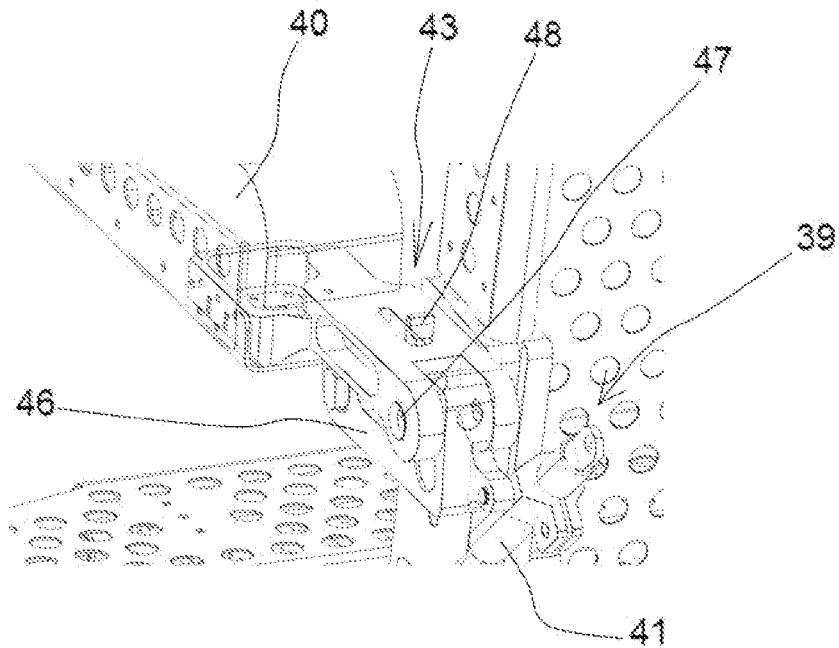

[Fig. 8b]
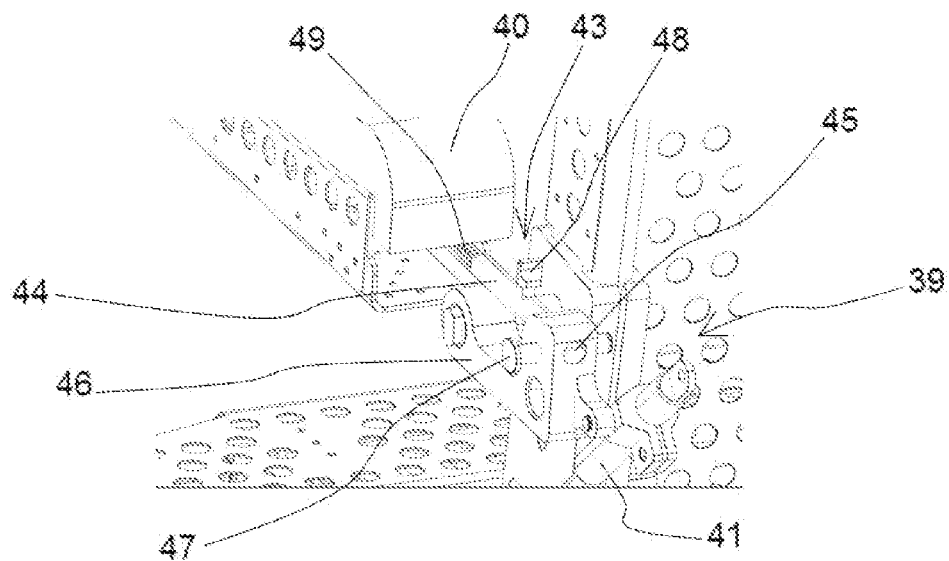
[Fig. 9]
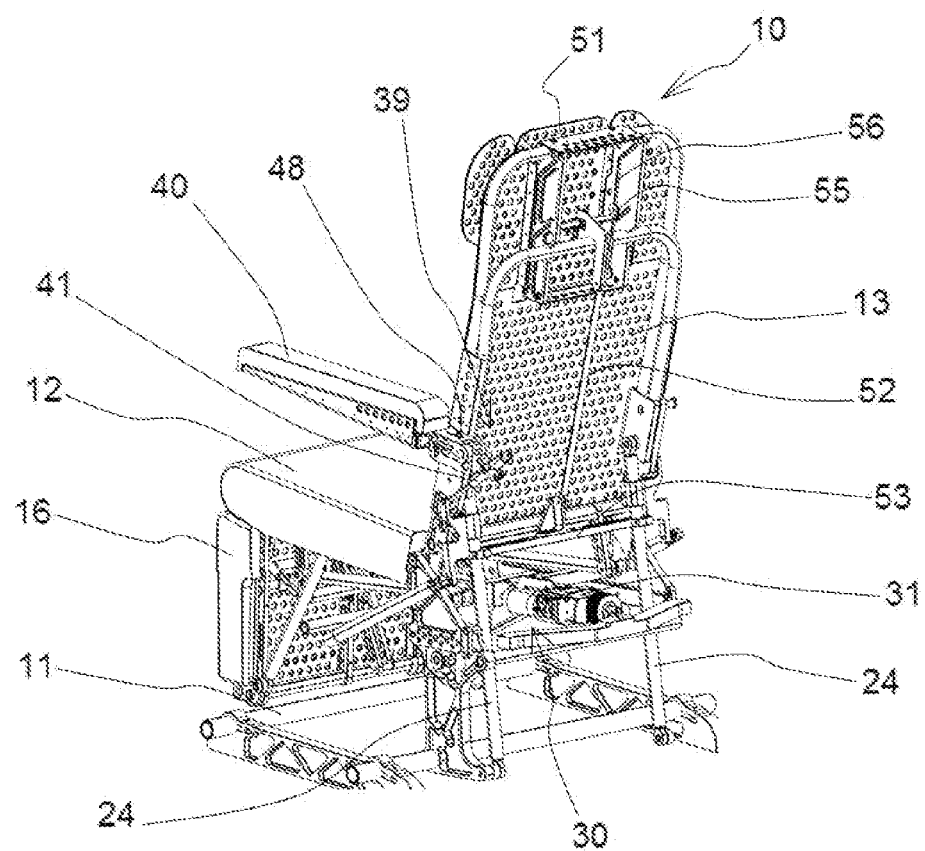

[Fig. 10a]
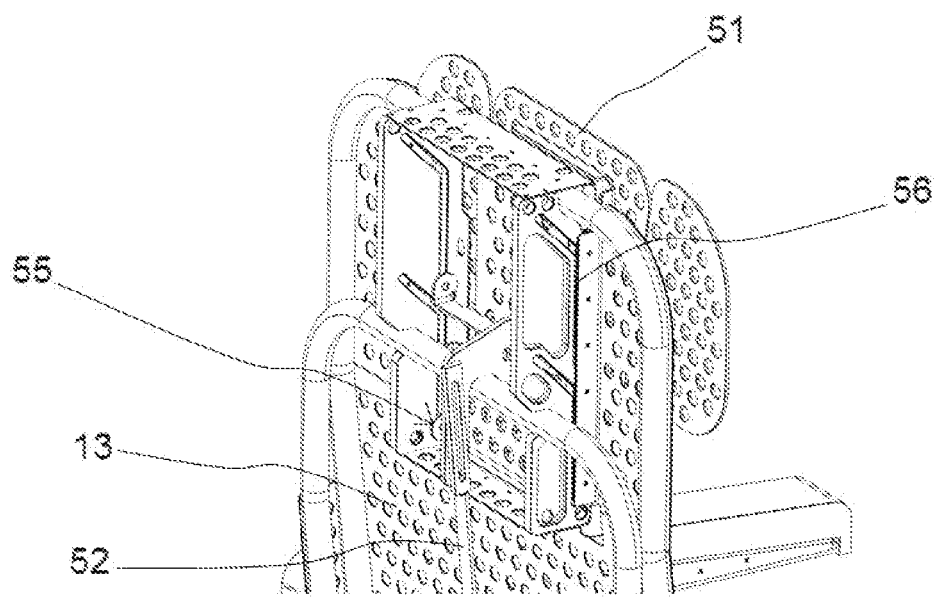
[Fig. 10b]
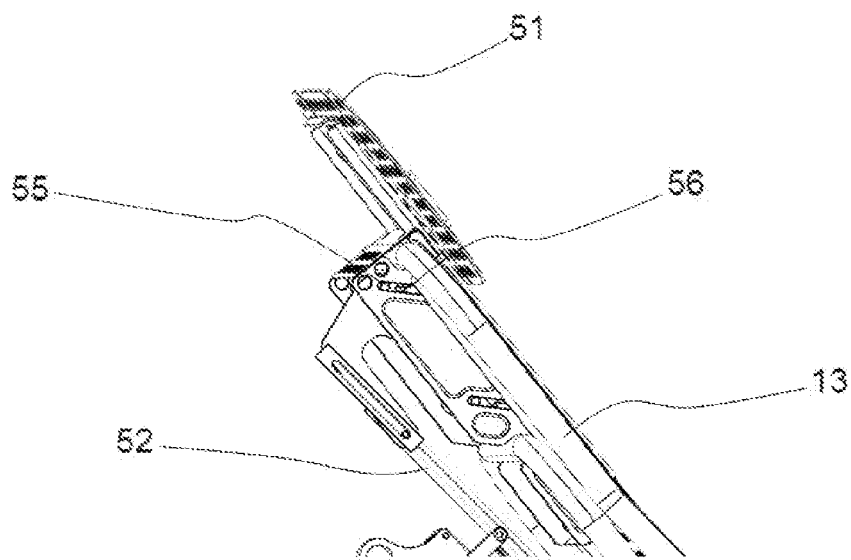

[Fig. 11a]
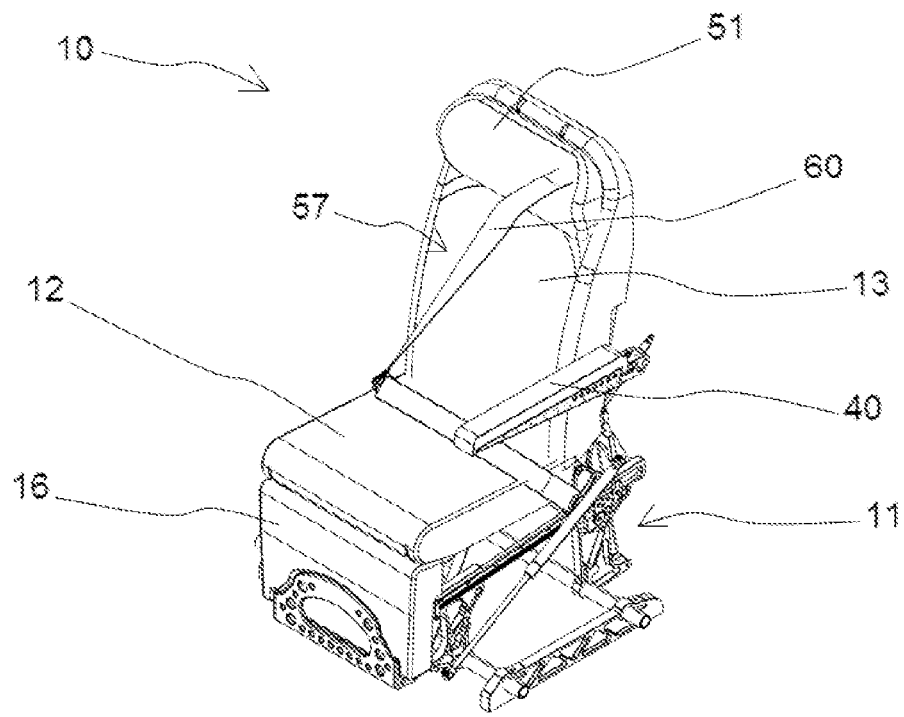
[Fig. 11b]
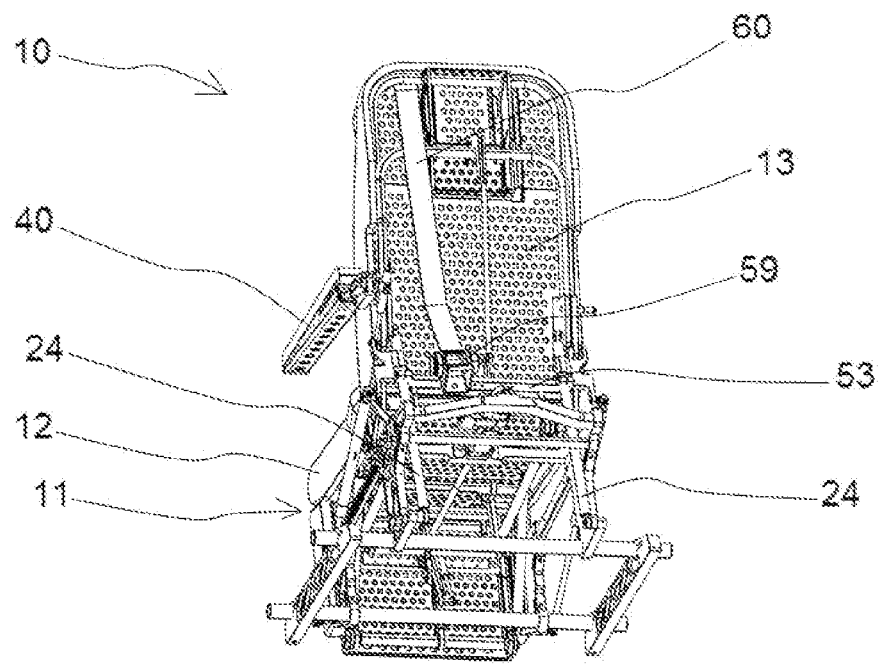

SEAT, IN PARTICULAR FOR AN AIRCRAFT, WITH A SINGLE ACTUATOR

CROSS-REFERENCE TO RELATED APPLICATIONS

This application is a national stage application of International Patent Application PCT/EP2020/079562, filed on Oct. 21, 2020 and titled "Seat, In Particular For An Aircraft, With A Single Actuator," which is related to and claims priority to France Patent Application No. 1912252, filed on Oct. 31, 2019, both of which are hereby incorporated by reference in their entireties.

The present invention relates to a seat, in particular for an aircraft, including a single actuator. The invention finds a particularly advantageous, but not exclusive, application with business class aircraft seats.

Business class passengers appreciate having electrically actuated seats in order to move from a seating position to a bed position. The passage from one position to another is usually carried out by simply pressing a button.

Generally, seats have independent actuation systems for all parts thereof in order to provide the passenger with a level of fine adjustment of the position thereof.

However, the multiplication of the number of actuators has the drawback of making the design of seats complex, and of increasing the mass thereof. This also creates a power supply problem, as the power required increases with the number of electric motors to be powered. In addition, the actuators are bulky, which makes it difficult to install electrical boxes and cables under the seat.

The objective of the invention is to effectively remedy at least one of the aforementioned drawbacks by proposing a seat, in particular for an aircraft, comprising:
- a seat support,
- a seating surface,
- a backrest articulated with respect to the seat via a pivot connection,
- a legrest articulated in relation to the seating surface via a pivot connection,
- said seat being movable between a seating position and a bed position in which the backrest and the legrest are located in an extension of the seating surface,
- the seating surface being mounted so as to slide with respect to the seat support,
- said seat comprising at least one link, so-called backrest pivot link, comprising a first end linked in rotation with respect to the backrest and a second end linked in rotation with respect to the seat support,
- the legrest being mechanically linked to the backrest by means of a link deployment device,
- said seat further comprising a single actuator capable of ensuring alone a movement of a set of components of the seat formed at least by the seating surface, the backrest, and the legrest for the passage of said seat from its seating position to its bed position and vice versa.

The invention thus makes it possible to propose a kinematics in which a single actuator makes it possible to move the seat from one extreme position to another. Reducing the number of actuators compared to a standard seat simplifies wiring, frees up space in the seat environment, and reduces seat weight. The invention also makes it possible to reduce the electrical consumption of the seat. It should also be noted that the kinematics of the seat according to the invention can easily be integrated into an existing seat. The invention will therefore make it possible to easily propose an independent kinematics or a kinematics including a single actuator for a common base structure.

According to one embodiment, the single actuator is arranged between the seating surface and the seat support.

According to one embodiment, said seat comprises at least one link, so-called seating surface pivot link, having a first end linked in rotation with respect to the seating surface and a second end linked in rotation with respect to the seat support.

According to one embodiment, the legrest comprises an extension carrying a footrest making it possible to provide support for the feet of a passenger when the extension is in a deployed position.

According to one embodiment, said seat further comprises an armrest and an armrest guide system capable of positioning the armrest in an extension of the backrest when the seat is in a bed position.

According to one embodiment, the guiding system comprises a gas jack having a first end linked in rotation with respect to the armrest and a second end linked in rotation with respect to the backrest pivot link.

According to one embodiment, said seat comprises a rotation unlocking system of the armrest provided with a finger movable in translation between a locked position, in which the finger cooperates with a housing provided in a fitting mechanically linked to the gas jack, and a disengaged position, in which the finger is disengaged from the housing provided in the fitting so as to allow free rotation of the armrest with respect to the fitting.

According to one embodiment, said seat comprises a headrest movable between a high position, in which the headrest is raised with respect to the backrest, and a low position, in which the headrest is located in an extension of the backrest so as to increase a bed surface.

According to one embodiment, the headrest is linked by a link to a crosspiece connecting two backrest pivot links.

According to one embodiment, the headrest carries at least one pin capable of sliding inside at least one groove provided with a first level corresponding to the high position of the headrest and a second level corresponding to the low position of the headrest.

According to one embodiment, said seat comprises at least one gas jack having a first end linked in rotation with respect to the backrest pivot link and a second end linked in rotation with respect to the seat support.

According to one embodiment, the link deployment device comprises:
- at least one link having a first end linked in rotation with respect to the backrest and a second end linked in rotation with respect to an intermediate piece linked in rotation with respect to the seating surface, and
- at least one gas jack having a first end linked in rotation with respect to the legrest and a second end linked in rotation with respect to the intermediate piece.

According to one embodiment, a gas jack is linked in rotation to the intermediate piece, to the legrest, and to the extension of the legrest so as to allow a deployment of the extension when the legrest passes into a raised position.

According to one embodiment, a winder for a strap for holding the upper part of the body of a passenger is fixed to a crosspiece linking two backrest pivot links together.

The invention further relates to an aircraft comprising at least one seat as previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1 is a side view of an aircraft seat according to the invention in a seating position;

FIG. 2a is a side view of an aircraft seat according to the invention in the intermediate position;

FIG. 2b is a perspective view of an aircraft seat according to the invention in the intermediate position showing the footrest;

FIG. 2c is a partial side view of an aircraft seat according to the invention in the intermediate position without the foams showing the detail of the sliding connection between the seating surface and the seat support;

FIG. 3a is a side view of an aircraft seat according to the invention in the bed position;

FIG. 3b is a bottom view of an aircraft seat according to the invention in the bed position;

FIG. 4 is a perspective view of the rear components of an aircraft seat according to the invention;

FIG. 5a is a perspective view showing the detail of the mechanical connection between the seating surface and the legrest of an aircraft seat according to the invention when the legrest is in the retracted position;

FIG. 5b is a perspective view showing the detail of the mechanical connection between the seating surface and the legrest when the legrest is in the raised position;

FIG. 6 is a partial perspective view showing the configuration of the linear actuator controlling the movement of the seat from one position to another;

FIG. 7 is a perspective view of an armrest of the aircraft seat according to the invention;

FIG. 8a is a general perspective view of an armrest unlocking system of the aircraft seat according to the invention;

FIG. 8b is a perspective view of the internal components of the armrest unlocking system in FIG. 8a, FIG. 9 is a rear perspective view of a seat according to the invention showing the mechanism for moving a headrest;

FIG. 10a is a perspective view showing a headrest in the high position;

FIG. 10b is a perspective view showing a headrest in the low position in which the headrest is in an extension of the backrest;

FIG. 11a shows a front perspective view of a seat according to the invention having a three fixing points configuration;

FIG. 11b shows a perspective view from below of a seat according to the invention having a three fixing points configuration.

It should be noted that in the figures the structural and/or functional elements common to the different embodiments may have the same references. Thus, unless otherwise stated, such elements have identical structural, dimensional and material properties.

FIGS. 1, 2a, 2b, 2c, 3a, 3b show a seat 10, in particular for an aircraft, comprising a seat support 11 for the fixation on the rails of an aircraft. For this purpose, the seat support 11 comprises legs carrying bolts (not shown) capable of securing the seat support 11 with the rails of the aircraft.

The seat 10 also comprises a seating surface 12, a backrest 13 articulated with respect to the seating surface 12 by means of a pivot link 14, and a legrest 16 articulated with respect to the seating surface 12 by means of a pivot link 17 as shown in FIG. 2c.

The seat 10 is movable between a seating position, visible in FIG. 1, in which the backrest 13 and the legrest 16 each form a non-zero angle with respect to the seating surface 12, and a bed position, visible in FIGS. 3a and 3b, in which the backrest 13 and the legrest 16 are located in an extension of the seating surface 12. The seat 10 can also take intermediate comfort positions, such as the position shown in FIGS. 2a, 2b, and 2c.

The seating surface 12 is slidably mounted with respect to the seat support 11, in particular by means of a slide connection 19 clearly visible in FIGS. 1, 2a and 3a. In the example shown, the slide connection 19 consists of a piece 20 bearing rollers 21 for cooperating with a rail 22 fixed to the seat support 11, as shown in FIG. 2c. The piece 20 carrying the rollers 21 is integral with the seating surface 12. Alternatively, the structure can be reversed, that is to say that the piece 20 carrying the rollers can be fixed on the seat support 11 while the rail 22 can be fixed on the seating surface 12. As a variant, the slide connection 19 consists of a piece fitted with pads sliding along a rail.

As can be seen in particular in FIGS. 2a and 2c, the seat 10 comprises at least one link 24, so-called backrest pivot link, comprising a first end linked in rotation with respect to the backrest 13 and a second end linked in rotation with respect to the seat support 11. In this case, the seat 10 comprises two backrest pivot links 24 arranged on either side of the backrest 13.

Furthermore, the legrest 16 is mechanically linked to the backrest 13 via a link deployment device 25 visible in particular in FIGS. 3b, 5a, and 5b. The link deployment device 25 comprises at least one link 26, in this case two, having a first end linked in rotation with respect to the backrest 13 and a second end linked in rotation with respect to an intermediate piece 27. The intermediate piece 27 is linked in rotation with respect to the seating surface 12. At least one gas jack 28 has a first end linked in rotation with respect to the legrest 16 and a second end linked in rotation with respect to the intermediate piece 27. The gas jack 28 makes it possible to absorb any shocks during the deployment of the legrest 16.

As can be seen in particular in FIGS. 1, 6, and 9, a single actuator 30 is arranged between the seating surface 12 and the seat support 11, so that said single actuator 30 is capable of ensuring only a movement of a set of components of the seat 10 formed at least by the seating surface 12, the backrest 13 and the legrest 16 so as to move said seat 10 from the sitting position 12 thereof to the bed position thereof and vice versa.

Preferably, the actuator 30 is a linear actuator comprising a body 31 cooperating with a rod 32 along which the body 31 is adapted to move, as shown in FIG. 6. The body 31 is integral with the piece 20 of the slide 19 carrying the rollers 21 while the rod 32 is fixed on the seat support 11. The rod 32 extends in a direction substantially parallel to the rails 22 of the slide connection 19. The actuator 30 is provided with an electric motor.

The movements of the various components of the seat 10 are not independent but linked to each other due to the particular layout of the aforementioned link mechanisms. Indeed, when moving the seat 10 from the sitting position 12 to the bed position, the actuator 30 generates a forward movement of the seating surface 12, and a rearward movement of the backrest 13 controlled by the backrest pivot link 24. In addition, the link 26 of the deployment device 25 pushes the intermediate piece 27, which rotates upwards so as to raise the legrest 16 via the gas jack 28. The seating surface 12, the backrest 13, and the legrest 16 are then substantially in the same plane in order to form a bed surface. According to a reverse movement, the seat 10 can return to the seating position.

Preferably, at least one link, so-called seat pivot link 33, has a first end linked in rotation with respect to the seating surface 12 and a second end linked in rotation with respect to the seat support 11. Such link 33 makes it possible to have a raised configuration of the seating surface 12 when the seat 10 is located in an intermediate comfort position, as illustrated by FIGS. 2a, 2b, and 2c.

Advantageously, as can be seen in particular in FIGS. 3a. 3b, 5a, and 5b, the legrest 16 may comprise an extension 35 carrying a footrest 36. The extension 35 is movable between a retracted position (cf. FIG. 5a) and an extended position (cf. FIG. 5b) making it possible to provide support for a passenger's feet. A gas jack 37 is linked in rotation to the intermediate piece 27 via a crosspiece 38, to the legrest 16, and to the extension 35 of the legrest 16. Thus, when the legrest 16 passes from a retracted position to a raised position, the gas jack 37 pushes on the extension 35 so that it passes into the deployed position and the footrest 36 is available for the passenger.

Furthermore, as can be seen in FIGS. 7, 8a 8b, and 9, a guiding system 39 is capable of positioning an armrest 40 in an extension of the backrest 13 when the seat 10 is in a bed position. In this case, the armrest 40 extends along a lateral side of the backrest 13 and thus increases the bed surface of the seat 10. A single armrest 40 is shown in the figures but two armrests 40 could be provided on either side of the seat.

As the armrest 40 is rotatably mounted with respect to the backrest 13, the guiding system 39 comprises a gas jack 41 having a first end linked in rotation with respect to the armrest 40 and a second end linked in rotation with respect to a backrest pivot link 24. Thus, when the seat 10 passes from the seating position to the bed position, the backward movement of the backrest 13 causes the movement of the armrest 40 towards the position thereof, in which the armrest 40 is in the extension of the backrest 13.

In addition, a rotation unlocking system 43 of the armrest 40 is provided with a finger 44 movable in translation between a locked position, in which the finger 44 cooperates with a housing 45 in a fitting 46 mechanically linked to the gas jack 41, and a disengaged position, in which the finger 44 is disengaged from the housing 45 in the fitting 46 so as to allow free rotation of the armrest 40 with respect to the fitting 46. The rotation of the armrest 40 is performed around an axis 47 carried by said fitting 46. The displacement of the finger 44 from the locked position to the unlocked position can be carried out by means of a button located in the upper part of the finger 44. A return spring 49 may be used to return the finger 44 into the locked position.

As can be seen in FIGS. 9, 10a, and 10b, the seat 10 may also include a headrest 51 movable between a high position, in which the headrest 51 is raised with respect to the backrest 13 (cf. FIG. 10a}, and a low position, in which the headrest 51 is located in an extension of the backrest 13 (cf. FIG. 10b) so as to increase a bed surface formed by the seat 10.

The headrest 51 is linked by means of a link 52 to a crosspiece 53 of the backrest pivot links 24. In addition, the headrest 51 carries at least one pin 55 capable of sliding inside at least one groove 56 provided with a first level corresponding to the high position of the headrest 51 and a second level corresponding to the low position of the headrest 51, as shown in FIGS. 10a and 10b. Thus, when the seat 10 passes into the bed position, the transition from the high position to the low position of the headrest 51 is carried out automatically.

As can be seen in FIGS. 1 and 4, at least one gas jack 58, in this case two, assists the actuator 30 in raising the backrest 13 when the seat 10 passes from the bed position to the seating position 12. Indeed, in the low position, the actuator 30 must provide a significant effort, which can be reduced thanks to the presence of the gas jack 58.

For this purpose, the gas jack 58 has a first end linked in rotation with respect to a backrest pivot link 24 and a second end linked in rotation with respect to the seat support 11.

In a seat with a three fixing points configuration, that is to say a seat provided with a seat belt 57 having a third fixing point at the top of the backrest 13, in addition to the other two conventional fixing points at the level of the seating surface 12, a winder 59 for a belt 60 for holding the upper part of the body of a passenger is fixed on the crosspiece 53 connecting two backrest pivot links 24 together, as illustrated in FIGS. 11a and 11b.

Such a configuration makes it possible to improve the behavior of the seat 10 in the event of an impact. Indeed, during a crash, the force path passes through the backrest pivot links 24 to the seat support 11 in addition to the actuator 30, then to the rail fixing bolts. This makes it possible to reduce the load on the slide connection 19 so as to absorb the forces generated by the presence of the third fixing point of the seat belt 57.

It should also be noted that in the event of an electrical failure, the gas jacks integrated into the seat 10 make it easier to raise the seat 10 after unlocking.

Alternatively, as all the elements of the seat are mechanically linked together, the single actuator 30 may be arranged between the seat support 11 and an element of the seat chosen from the seating surface 12, the backrest 13, or the legrest 16. Alternatively, the single actuator 30 may also be arranged between two elements of the seat 10, in particular between the seating surface 12 and the backrest 13 or between the seating surface 12 and the legrest 16 or between the backrest 13 and the legrest 16.

The invention also relates to an aircraft comprising at least one seat 10 as previously defined.

Of course, the different characteristics, variants and/or embodiments of the present invention can be associated with each other in various combinations insofar as they are not incompatible with or exclusive of one another.

Obviously, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. A seat, in particular for an aircraft, comprising:
a seat support,
a seating surface,
a backrest articulated with respect to the seating surface via a pivot connection,
a legrest articulated with respect to the seating surface via a pivot connection,
said seat being movable between a seating position and a bed position, in which the backrest and the legrest are located in an extension of the seating surface,
characterized in that the seating surface is slidably mounted with respect to the seat support,
and in that said seat comprises at least one link, so-called the backrest pivot link, comprising a first end linked in rotation with respect to the backrest and a second end linked in rotation with respect to the support seat, the legrest being mechanically linked to the backrest by means of a link deployment device, said seat further comprising a single actuator capable of ensuring alone a movement of a set of components of the seat formed at least by the seating surface, the backrest, and the legrest for the passage of said seat from its seating position to its bed position and vice versa.

2. The seat according to claim 1, characterized in that the single actuator is arranged between the seating surface and the seat support.

3. The seat according to claim 1, characterized in that it comprises at least one link, so-called seating surface pivot link, having a first end linked in rotation with respect to the seating surface and a second end linked in rotation with respect to the seat support.

4. The seat according to claim 1, characterized in that the legrest comprises an extension carrying a footrest making it possible to provide support for the feet of a passenger when the extension is in a deployed position.

5. The seat according to claim 1, characterized in that it further comprises an armrest and a guiding system for the armrest capable of positioning the armrest in an extension of the backrest when the seat is in a bed position.

6. The seat according to claim 5, characterized in that the guiding system comprises a gas jack having a first end linked in rotation with respect to the armrest and a second end linked in rotation with respect to the backrest pivot link.

7. The seat according to claim 5, characterized in that it comprises a rotation unlocking system for the armrest provided with a finger movable in translation between a locked position, in which the finger cooperates with a housing in a fitting mechanically linked to the gas jack, and a disengaged position, in which the finger is disengaged from the housing in the fitting so as to allow free rotation of the armrest with respect to the fitting.

8. The seat according to claim 1, characterized in that it comprises a headrest movable between a high position, in which the headrest is raised with respect to the backrest, and a low position, in which the headrest is located in an extension of the backrest so as to increase a bed surface.

9. The seat according to claim 8, characterized in that the headrest is linked by a link to a crosspiece connecting two backrest pivot links together.

10. The seat according to claim 8, characterized in that the headrest carries at least one pin adapted to slide inside at least one groove provided with a first level corresponding to the high position of the headrest and a second level corresponding to the low position of the headrest.

11. The seat according to claim 1, characterized in that it comprises at least one gas jack having a first end linked in rotation with respect to the backrest pivot link and a second end linked in rotation with respect to the seat support.

12. The seat according to claim 1, characterized in that the link deployment device comprises:

at least one link having a first end linked in rotation with respect to the backrest and a second end linked in rotation with respect to an intermediate piece linked in rotation with respect to the seating surface, and at least one gas jack having a first end linked in rotation with respect to the legrest and a second end linked in rotation with respect to the intermediate piece.

13. The seat according to claim 4, characterized in that a gas jack is linked in rotation to the intermediate piece, the legrest, and the extension of the legrest so as to allow a deployment of the extension when the legrest moves into a raised position.

14. The seat according to claim 1, characterized in that a winder for a belt for holding the upper part of the body of a passenger is fixed on a crosspiece connecting two backrest pivot links together.

15. Aircraft comprising at least one seat as defined according to claim 1.

* * * * *